Figure 1:
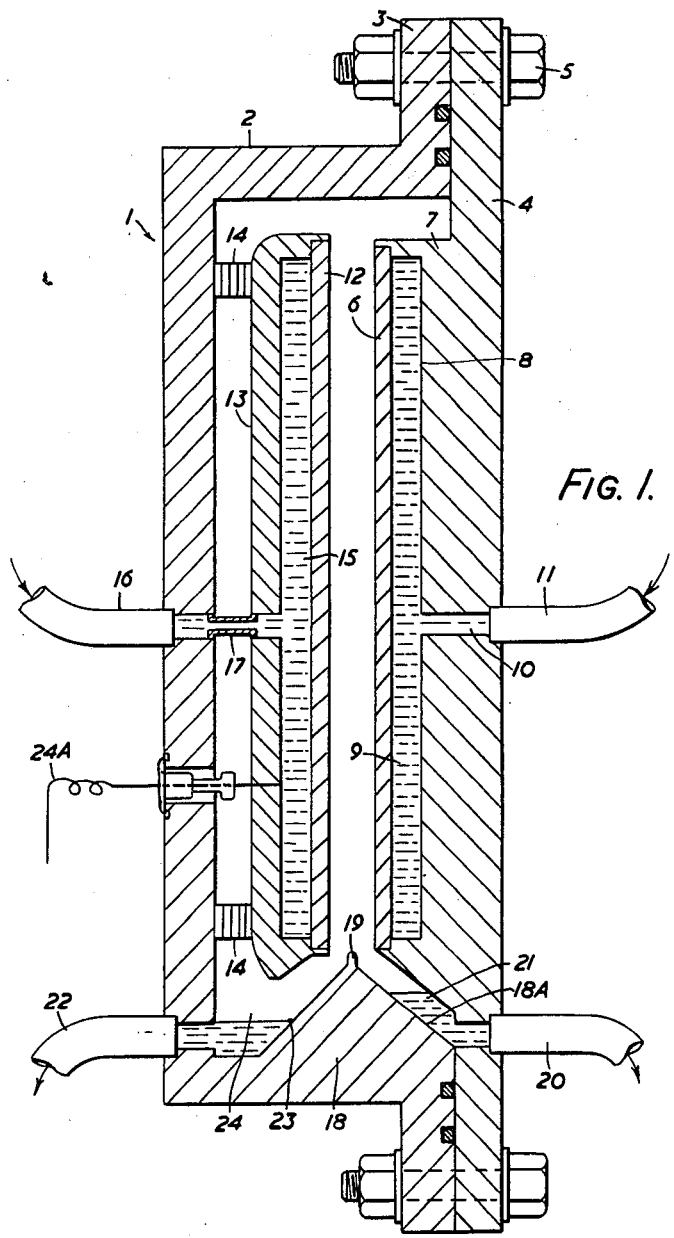

3,110,803
DETECTION OF FISSION PRODUCTS IN A WATER COOLED REACTOR BY PRECIPITATING DAUGHTER PRODUCTS ON A LIQUID COVERED ELECTRODE
Murray Vincent Wilson, Northampton, England, assignor to The Plessey Company Limited, London, England, a British company
Filed June 16, 1960, Ser. No. 36,689
Claims priority, application Great Britain June 19, 1959
6 Claims. (Cl. 250—43.5)

This invention relates to the detection of fission products and is more particularly, but not exclusively, concerned with the detection of fission products in the coolant streams of water cooled reactors.

According to the invention there is provided apparatus for detecting fission products in a first fluid carrier medium, comprising means for transferring gaseous fission products from the first fluid carrier medium to a carrier gas phase, means for electrostatically precipitating active solid daughters of the fission products from the gaseous fission products from the carrier gas phase and transferring them to a second fluid carrier medium, and means for measuring the activity of the precipitated daughter products entrained in the second carrier medium.

It is necessary that the gaseous fission products are initially transferred to a compatible carrier gas phase by a process known as "scrubbing" or "stripping." As large as possible interface is preferably produced between the carrier gas on a coolant water sample, the fission product gases being largely transferred to the gas phase. Hitherto such a process has necessitated the use of special scrubbing equipment utilising gas circulating pumps to produce a required driving pressure head for the gas. Furthermore when a re-circulating gas circuit is used the size of the gas circuit has previously been fairly large so as to minimise the effect of fission product build-up in the gas phase. For a better understanding of the invention reference will now be made to the drawing accompanying the specification, in which—

Figure 2:
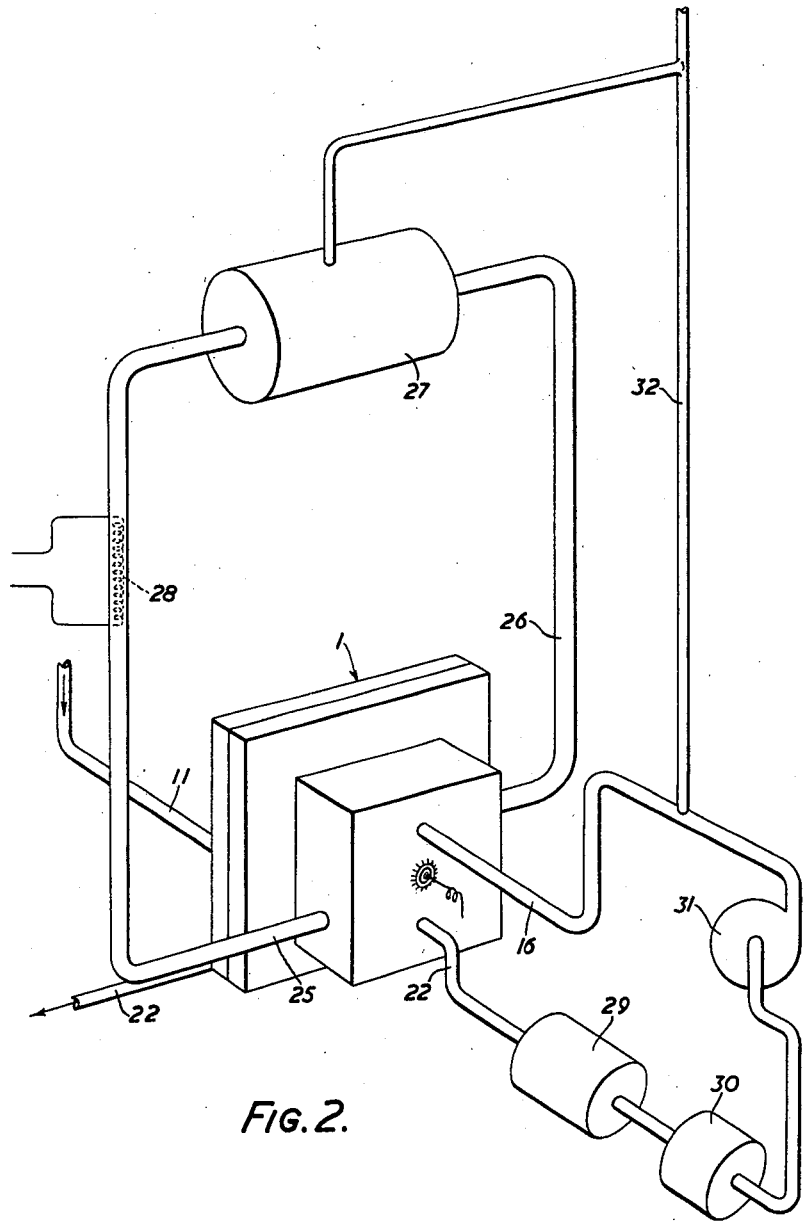

FIGURE 1 is a sectional view of a device for stripping and precipitating fission products, and FIGURE 2 is a diagrammatic arrangement of an installation utilising the stripper and precipitator illustrated in FIGURE 1.

The combined stripper and precipitator shown in FIGURE 1 includes a bipartite stainless steel pressure shell 1, one part 2 of the shell being formed by a rectangular hollow container having an outwardly directed flange 3 and the other part 4 of the shell being formed by a plate which is secured to the part 2 by bolts 5 which engage with the flange 3. A sintered stainless steel porous plate 6 is secured to an inwardly directed flange 7 integrally connected with the inner face of the part 4. The flange 7, the porous plate 6 and the inner face 8 of the part 4 define a hollow shallow cavity 9. The cavity 9 is connected via a bore 10 with a water sample inlet conduit 11. A second sintered stainless steel porous plate 12 which is parallel to the plate 6 is positioned opposite to the plate 6. The plate 12 is connected to the walls of a shallow stainless steel tray 13 which schematically is secured to the inner face of the part 2 by means of electrically insulating supports 14. The base and walls of the tray 13 and the inner face of the porous plate 12 define a hollow cavity 15 which is connected, with a clean water inlet supply conduit 16, via bores in the tray 13 and part 2 and a connecting conduit 17.

An inverted V-shaped projection 18 is provided at the lower part of the shell part 2. The projection 18 has an upwardly directed tip 19 which is substantially in line with, and midway between the lowermost parts of the plates 6 and 12. A conduit 20 connects with an inclined cavity 21 located between the lowermost inclined surface 7A of the flange 7 and the inclined surface 18A of the projection 18. A conduit 22 connects with the lowermost part of a cavity 24 defined by the inner wall of the part 2 and the inclined surface 23 of the projection 18. The tray 13 and the plate 12 are raised to a negative potential via an electrical connection 24A which is electrically insulated from the stainless steel shell 1. Sample water containing the fission products is introduced through the conduit 11 into the cavity 9 and is forced through the porous plate 6 by a small pressure head. A film of water is consequently produced on the outermost face of the plate 6. The tip 19 is so positioned with respect to the plates 6 and 12 that it deflects fluid dripping from the surface of the plate 6 into the cavity 21. Similarly clean water is introduced through the conduit 16 into the cavity 13 under a small pressure head so that water passes through the porous plate 12 to form a water film on the outside face of the plate 12 which drains towards the cavity 24. That is to say the tip 19 keeps the two water supplies separate.

Means are provided for introducing a gaseous media into the interior of the pressure shell 1. These connections are not shown in FIGURE 1.

Referring now to FIGURE 2 which illustrates an installation utilising the combined stripper and precipitator of FIGURE 1. The installation has a gas inlet conduit 25 and a gas outlet conduit 26. The conduits 25 and 26 connect with a gas circuit delay tank 27. A heater 28 is provided for producing a convection circulation within the gas. A clean water circuit connecting with the inlet conduit 16 and the outlet conduit 22 includes a heavily shielded radiation detector or counter 29 series with a delay tank 30 which connects with a fluid pump 31 whose output is connected with the inlet conduit 16. A pressure tapping 32 which is coupled via tappings to a reactor blanket (not shown) has a branch tapping 33 leading to the gas circuit delay tank 27. In many water cooled reactors a blanket gas is used. Since the water, besides providing cooling, is also sometimes used as the moderator, it is necessary to change the water level inside the reactor vessel. The variable space above the water surface is filled by the blanket gas, so called because it covers the water surface. If the reactor is pressurised, more or less, it is convenient to do this via the blanket gas. The gas also aids cleaning of the reactor water since the fission product gases, dissociated hydrogen and oxygen from the water, etc., escape readily into the gas phase and can be removed by a cold trap or combined very conveniently in the gas phase.

The precipitator contains a gas volume which must not vary appreciably with change of reactor pressure. This may be conveniently ensured by a pressure tapping pipe which connects the precipitator gas space to the blanket gas circuit, i.e. the blanket gas is used to pressurise the reactor, the precipitator and the clean water circuit to effectively the same pressure. Thereafter it is only necessary to arrange that the precipitator and clean water circuits are at suitable levels to produce the small water heads required to drive the water samples through the precipitator.

The apparatus is used as follows:

A sample containing the radioactive fission products is introduced into the chamber 9 via the conduit 11. A pressure head in the water causes the contaminated water to percolate through the porous plate 6 and appear at the inner face of the plate. At the same time a continuous flow of clean water is produced at the inner face of the porous plate 12. The gas may be moved slowly through the instrument by means of the connection circuit or may be stagnant during the monitory cycle and purged between monitoring cycles. The motion of the gas is such that it passes between the plates in the direction parallel to the surfaces of the plates (not perpendicular). The fission product gases, krypton and xenon, are uncharged. These readily transfer themselves from the sample liquid to the gas phase because they are extremely insoluble in water. Once in the gas, however, some of the krypton and xenon decays to form rubidium and caesium. These atoms are heavily ionised (charged) by the decay and are moved by the electrostatic field between plates 6 and 12 towards plate 12, i.e. the motion is caused electrostatically and not by the gas flow. The decay atoms rubidium and caesium formed before the fission product gases leave the sample water are metallic atoms, as opposed to inert gas atoms and, therefore will not leave the water. (Moreover they are of the same chemical family as sodium and potassium and will combine strongly with water.) The daughter products are carried away by this water as it drains from the plate 12 into the cavity 24. The clean water containing the fission products caesium and rubidium is transferred to the counter 29 wherein the precipitated activity is measured. The counter 29 may be for example of a scintillation or proportional type or a collection of Geiger tubes. It will be seen that the gaseous fission products are discharged into the gas phase and there, some of them decay to form the ionised daughter particles. These latter are attracted towards the negatively charged porous plate 12.

Apparatus may be used for continuous monitoring or, for example scanning, and the activity counts may be continuous rate measurements or integrated counts. For continuous monitoring a very low flow of gas is required to pass through the apparatus and, for example, sample scanning requires that a slightly increased gas flow be used, or alternatively an intermittent purge is required to prevent "smearing" (i.e. activity counts from one sample appearing in another). If purging is used the gas may be static during measurements of any sample and removed when the sample is changed.

If desired, the flow of gas can be interrupted by a solenoid valve so as to produce intermittent flow. Alternatively, the gas flow, or intermittent purge, may be supplied from a source of pressurised gas, as opposed to the use of the heater.

If desired the construction combined precipitator can be based upon plane circular members or annular concentric cylinders rather than the box-like construction described above.

What I claim is:

1. Apparatus for detecting fission products in a first liquid carrier medium comprising a first and second spaced apart parallelly arranged porous plates, means for feeding the first liquid carrier medium containing gaseous fission products under a pressure head which forces the first carrier medium through the first plate so as to produce a liquid film which continuously drains under gravity across the surface of the first plate, means for producing an electro-static field perpendicularly to the planes of the plates, means for feeding a second liquid carrier medium under a predetermined pressure head through the second porous plate so as to produce a continuously moving film of carrier medium on the surface of the second plate which drains under the action of gravity across the surface of the plate, weir means for preventing the first and second liquid carrier medias from intermingling, the weir means comprising an inverted V-shaped projection extending into the lowermost zones of the space between the first and second plates, the projection extending the full length of the bottom edges of the plates, means for producing a gas flow between the plates in a direction parallel to the surfaces, and means for transferring the liquid draining from the second plate to a counter device.

2. Apparatus for detecting fission products in a first liquid carrier medium comprising a first and second spaced apart parallelly arranged porous rectangular plates, means for feeding the first liquid carrier medium containing gaseous fission products under a pressure head which forces the first carrier medium through the first plate so as to produce a liquid film which continuously drains under gravity across the surface of the first plate, means for producing an electro-static field perpendicularly to the planes of the plates, means for feeding a second liquid carrier medium under a predetermined pressure head through the second porous plate so as to produce a continuously moving film of carrier medium on the surface of the second plate which drains under the action of gravity across the surface of the plate, weir means for preventing the first and second liquid carrier medias from intermingling, the weir means including an inverted V-shaped projection extending lengthwise of the bottom edges of the plates, an upwardly directed tip to the projection, the tip being in line with and midway between the lowermost parts of said plates, means for producing a gas flow between the plates in a direction parallel to the surfaces, and means for transferring the liquid draining from the second plate to a counter device.

3. Apparatus for detecting fission products in a first liquid carrier medium comprising a first and second spaced apart parallelly arranged porous sintered plates, means for feeding the first liquid carrier medium containing gaseous fission products under a pressure head which forces the first carrier medium through the first plate so as to produce a liquid film which continuously drains under gravity across the surface of the first plate, means for producing an electro-static field perpendicularly to the planes of the plates, means for feeding a second liquid carrier medium under a predetermined pressure head through the second porous plates so as to produce a continuously moving film of carrier medium on the surface of the second plate which drains under the action of gravity across the surface of the plate, weir means for preventing the first and second liquid carrier medias from intermingling and means for transferring the liquid draining from the second plate to a counter device.

4. Apparatus for detecting fission products in a first liquid carrier medium comprising a first and second spaced apart parallelly arranged porous plates, means for feeding the first liquid carrier medium containing gaseous fission products under a pressure head which forces the first carrier medium through the first plate so as to produce a liquid film which continuously drains under gravity across the surface of the first plate, means for producing an electro-static field perpendicularly to the planes of the plates, means for feeding a second liquid carrier medium under a predetermined pressure head through the second porous plate so as to produce a continuously moving film of carrier medium on the surface of the second plate which drains under the action of gravity across the surface of the plate, weir means for preventing the first and second liquid carrier medias from intermingling, a gas inlet duct for introducing gas into the space between the plates, a gas outlet duct located above and spaced from the gas inlet duct for removing the gas from the space between the plates, a gas circuit delay tank, conduit means connecting the gas inlet and outlets with the delay tank to form a closed gas circuit, and heater means in the conduit connected with the gas inlet for heating the gas to produce a convection gas flow of gas between the plates in a direction parallel to the surfaces, and means for transferring the liquid draining from the second plate to a counter device.

5. Apparatus for detecting fission products in a first liquid carrier medium comprising a first and second spaced apart parallelly arranged porous plates, means for feeding the first liquid carrier medium containing gaseous fission products under a pressure head which forces the first carrier medium through the first plate so as to produce a film which continuously drips under gravity across the surface of the first plate, means for producing an electrostatic field perpendicularly to the planes of the plates, means for feeding a second liquid carrier medium under a predetermined pressure head through the second porous plate so as to produce a continuously moving film of carrier medium on the surface of the second plate which drains under the action of gravity across the surface of the plate, weir means for preventing the first and second liquid carrier medias from intermingling, means for producing a gas flow between the plates in a direction parallel to the surfaces, and means for transferring the liquid draining from the second plate to a counter device.

6. Apparatus as claimed in claim 5, wherein each plate forms a side wall of a chamber into which the respective carrier liquid can be introduced.

References Cited in the file of this patent
UNITED STATES PATENTS

| | | |
|---|---|---|
| 2,576,616 | Livingston | Nov. 27, 1951 |
| 2,599,922 | Kanne | June 10, 1952 |
| 2,625,657 | Kanne | Jan. 13, 1953 |
| 2,755,391 | Keyes | July 17, 1956 |